United States Patent [19]

Farinacci et al.

[11] Patent Number: 4,889,973
[45] Date of Patent: Dec. 26, 1989

[54] AQUARIUM HEATER

[76] Inventors: Michael F. Farinacci, 4680 Willoughcroft, Willoughby, Ohio 44094; William A. Rowell, 238 Woodie Brook Rd., Chardon, Ohio 44024

[21] Appl. No.: 256,604

[22] Filed: Oct. 12, 1988

[51] Int. Cl.⁴ .............................................. H05B 3/20
[52] U.S. Cl. ..................................... 219/528; 219/311; 219/345; 219/526; 219/536; 219/328; 119/5
[58] Field of Search ............... 219/311, 345, 523, 528, 219/549, 526, 535, 536, 342, 385, 310, 312, 328, 436, 464; 119/5

[56] References Cited

U.S. PATENT DOCUMENTS

| | | | |
|---|---|---|---|
| 2,805,313 | 5/1956 | Lumb | 219/528 |
| 3,842,241 | 10/1974 | Isaacson | 219/311 |
| 3,890,486 | 6/1975 | Fitzgerald | 219/523 |
| 4,313,048 | 1/1982 | Holbrook | 219/311 |
| 4,333,626 | 6/1982 | Holbrook | 219/311 |
| 4,652,726 | 3/1987 | Femino | 219/217 |

FOREIGN PATENT DOCUMENTS 7900705  9/1979  European Pat. Off. ............ 219/345

Primary Examiner—B. A. Reynolds
Assistant Examiner—Leon K. Fuller
Attorney, Agent, or Firm—Michael H. Minns

[57] ABSTRACT

An aquarium heater which consists of a heater pad attached to the outside bottom surface of the aquarium. The heater pad uses an etched-foil heating element laminated between layers of insulating material. Normally, the heat is attached to the bottom of the tank using a pressure sensitive adhesive. The aquarium water temperature is maintained using a current limiting electronic controller and a thermistor for sensing temperature. The thermistor is located in the heater pad between the two layers of insulation.

4 Claims, 2 Drawing Sheets

AQUARIUM HEATER

FIELD OF INVENTION

The present invention relates to heaters used to maintain controlled temperatures in tank like enclosures. More particularly, the invention relates to externally heating aquariums and terrariums.

BACKGROUND OF THE INVENTION

This invention is directed at externally heating enclosed containers such as aquariums, terrariums and the like using flat etched-foil heating elements.

Typical prior art heating elements were placed inside the tank which resulted in the heater being immersed in water when used with an aquarium. Since these heaters are electrically operated, there is a danger of electrical shock in the event the heater malfunctions. The heaters also take up space in the tank which could have been used for additional fish, scenery, or plants. Additionally the heaters are readily visible and detract from the aesthetic appearance of the tank.

More recent prior art has been directed at flat or relatively thin heating elements disposed on the sides or back of the tanks. One, U.S. Pat. No. 3,842,241, an externally mounted heater, requires a separate temperature controller and temperature sensor. The sensor must be immersed in the water in the tank and requires an additional connection between the sensor and the heater. These external side or back mounted heaters do not detract as much from the aesthetic appearance of the aquarium as do the immersible heaters. When a heater is mounted on the side of an aquarium, it is not generally visible by a person viewing through the front of the tank as long as the Brewster angle is not exceeded. For large aquariums, a side-mounted heater is visible from much of the front wall.

The present invention is located on the outside bottom of the tank where it will not interfere with the aesthetic appearance of the tank.

Prior art heaters, such as the one disclosed in U.S. Pat. No. 4,333,626, utilize resistance rope which tends to sink into the heater insulation. An etched-foil heating element which is used in the present invention does not sink into the insulating layers. Thinner insulating layers may be used allowing thinner heaters. Etched-foil heating elements have considerably more heat transfer area than prior art wire wound or resistance rope heaters. U.S. Pat. No. 4,333,626 specifically teaches the use of a heat transfer plate having an area at least an order of magnitude greater than the heating element. The larger heat transfer area of an etched-foil heating element eliminates the need for a heat transfer plate.

The temperature controllers used in prior art heaters have frequently used thermostats or bimetallic strips. See, for example, U.S. Pat. Nos. 3,890,486, 4,313,048, and 4,333,626. The contact points in these prior art temperature controllers can stick together which will result in overheating the tank and could be a fire hazard. Overheating an aquarium can kill the fish. The present invention uses an electronic temperature controller which eliminates the possibility of overheating due to sticking contact points.

SUMMARY OF THE INVENTION

The aquarium heater consists of an etched-foil element which is laminated between two layers of insulation. The heater heats the tank from the outside. Normally, the heater is attached to the bottom of the tank using a pressure sensitive adhesive.

The desired temperature in the tank is maintained using a current limiting electronic controller and a thermistor for sensing temperature. The thermistor is located in the heater pad between the two layers of insulation.

DETAILED DESCRIPTION OF THE INVENTION

Figure 1:
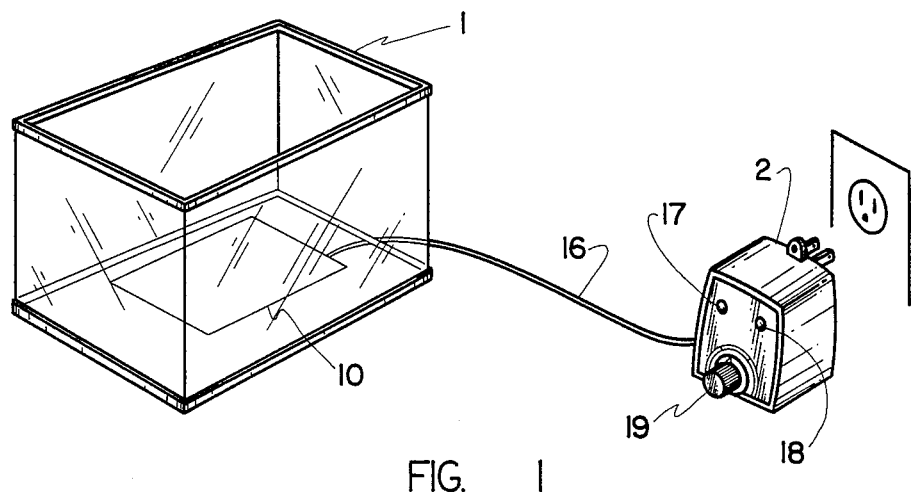
FIG. 1 is a perspective view of an aquarium tank showing the heater attached to the bottom of the tank.
Figure 2:
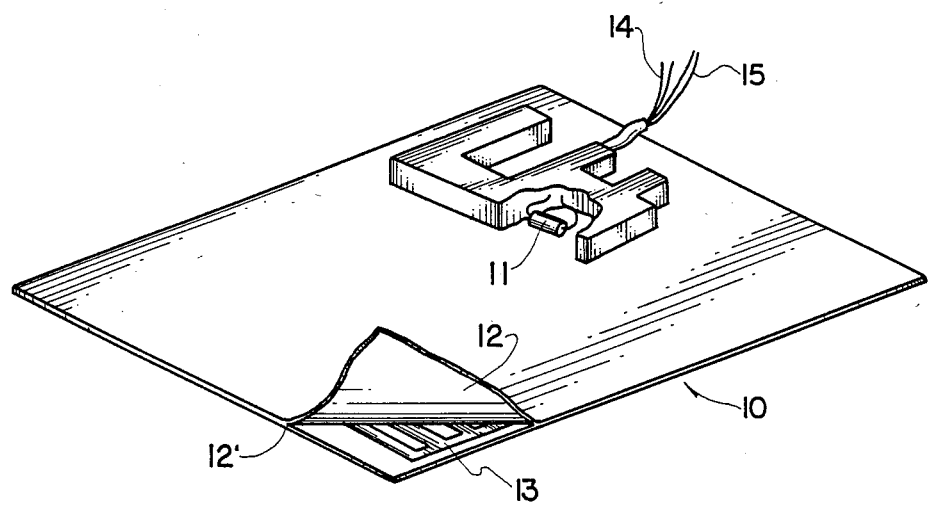
FIG. 2 is a perspective view of the heater pad with a portion of the upper insulation removed.

FIG. 1 shows a heater pad 10 applied to the bottom of an open top tank 1. An insulated cable 16 connects a power and control unit 2 to the heater pad 10. This insulated cable contains two pairs of electrical conductors; one pair 14 is used to supply electrical power to an etched-foil heating element 13 and the other pair 15 connects a thermistor 11 to the power and control unit 2.

The heater pad 10 consists of an etched-foil heating element 13 laminated between layers of insulating material 12, 12'. The insulating material is a pliable non-conducting material. Insulators such as polyimide film, silicon rubber, Kapton, or Nomex can be used. (Kapton and Nomex are DuPont trade names.)

A thermistor 11 is used to sense the temperature in the heater pad 10. The thermistor is located in an area of the heater pad which does not contain any portion of the etched-foil heating element 13. The temperature in the heater pad 10 is maintained at a desired setting by a current limiting electronic controller (not shown in the figures) which is located in the power and control unit 2.

The current limiting electronic controller is of conventional design. The controller uses the resistance of the thermistor 11 as the measurement of heater pad 10 temperature. The electronic controller is current limiting so as not to induce self-heating in the thermistor.

The power and control unit contains two indicator lamps 17, 18. One lamp 17 indicates whether or not electrical power is available to the power and control unit 2. The other lamp 18 indicates whether the heater pad 10 is on or off. A control knob 19 is provided to allow adjustment of the desired temperature setpoint.

The upper surface of the top layer of insulation 12 can be coated with a pressure sensitive adhesive (not shown in the figures). The heater pad 10 is applied to the bottom of the tank 1 by pressing the heater pad against the outside bottom surface. The pressure sensitive adhesive holds the heater pad in place.

After the heater pad 10 has been applied to the bottom of the tank 1, the tank is filled with water, rocks, dirt, fish, reptiles, plants, or whatever other items are desired. The power and control unit 2 is plugged into a standard electrical power outlet and the control knob 19 is set to about the desired temperature. When the temperature in the heater pad 10 as sensed by the thermistor 11 is lower than the desired setting, the current limiting electronic controller turns the etched-foil heating element 13 on by connecting the heating element with electrical power. The electronic controller does not use any electro-mechanical switches (conducting contact points) in order to eliminate potential overheating caused by contact points sticking together. After the tank 1 and its contents have reached an equilibrium temperature with the heater pad 10, the temperature inside the tank is measured. If it is higher or lower than the desired temperature, the control knob 19 is adjusted as appropriate. The current limiting electronic controller will continue to turn the etched-foil heating element 13 on and off so as to maintain the desired temperature. Indicator lamp 18 will be lit whenever the current limiting electronic controller is supplying power to the etched-foil heating element.

The present invention eliminates the hazard of electrical shock that is present in the prior art since none of its components are immersed in water. Certification by Underwriters Laboratories is expected for the current embodiment of the heater. According to an industry publication, no prior art heater has received Underwriters Laboratories' Certification.

The heating of the water in an aquarium is more uniform than either the immersible heaters or the side-mounted heaters provide. Since the heater is on the bottom of the tank, the heated water immediately above it rises and the cooler water near the top surface of the water falls. This results in convection currents that cause thorough mixing of the water. The side mounted heaters cause some convection currents, but the mixing effect is limited to the immediate vicinity of the heater.

There is some evidence that indicates that algae growth in an aquarium is reduced when the aquarium is heated with the present invention. This phenomena may be due to the even mixing of the water in the aquarium as a result of the convection currents described above. Some algae growth is desirable. However excessive algae growth should be avoided.

The current embodiment of the heater might also be used to heat water beds, terrariums, reptile tanks, seed beds, film developing tanks, and other tank like enclosures. Prior art water bed heaters have required a separate temperature sensor with separate insulated wires between the temperature sensor and the temperature controller.

We claim:
1. An aquarium heater for mounting on the outside bottom surface of an aquarium tank or the like comprising;
   (a) a heating pad wherein said heating pad comprises an etched-foil heating element laminated between layers of insulating material, said etched-foil heating element being arranged to provide a clear space within said heating pad;
   (b) a thermistor for sensing the temperature of said heating pad wherein said thermistor is located within said clear space; and
   (c) an electronic circuit for controlling the temperature in said heating pad wherein said circuit operates to limit the current in the thermistor below the point at which self-heating occurs.

2. An aquarium heater as in claim 1 wherein said heating pad is attached to the outside bottom surface of said aquarium tank by means of pressure sensitive adhesive.

3. An aquarium heater as in claim 1 wherein said electronic circuit controls said heating element to maintain said aquarium tank internal temperature substantially constant.

4. An aquarium heater for mounting on the outside bottom surface of an aquarium tank or the like comprising;
   (a) a heating pad wherein said heating pad comprises an etched-foil heating element laminated between layers of insulating material, said etched-foil heating element being arranged to provide a clear space within said heating pad;
   (b) a thermistor for sensing the temperature of said heating pad wherein said thermistor is located within said clear space; and
   (c) an electronic circuit for controlling the temperature in said heating pad wherein said circuit operates to limit the current in the thermistor below the point at which self-heating occurs and said circuit controls said heating element to maintain said aquarium tank internal temperature substantially constant.

* * * * *